United States Patent
Miley et al.

(10) Patent No.: US 11,440,167 B2
(45) Date of Patent: Sep. 13, 2022

(54) ANTI-MARRING BIT HOLDER

(71) Applicant: APEX BRANDS, INC., Apex, NC (US)

(72) Inventors: Chad Aaron Miley, Camden, OH (US); Timothy Edward Heitkamp, Tipp City, OH (US); Robert John Rich, Eaton, OH (US)

(73) Assignee: APEX BRANDS, INC., Apex, NC (US)

( * ) Notice: Subject to any disclaimer, the term of this patent is extended or adjusted under 35 U.S.C. 154(b) by 71 days.

(21) Appl. No.: 16/467,199

(22) PCT Filed: Dec. 8, 2017

(86) PCT No.: PCT/US2017/065219
§ 371 (c)(1),
(2) Date: Jun. 6, 2019

(87) PCT Pub. No.: WO2018/106976
PCT Pub. Date: Jun. 14, 2018

(65) Prior Publication Data
US 2020/0086462 A1    Mar. 19, 2020

Related U.S. Application Data

(60) Provisional application No. 62/431,498, filed on Dec. 8, 2016.

(51) Int. Cl.
| | | |
|---|---|---|
| *B23B 31/107* | (2006.01) | |
| *B25B 23/00* | (2006.01) | |
| *B25B 23/12* | (2006.01) | |

(52) U.S. Cl.
CPC ......... *B25B 23/0035* (2013.01); *B25B 23/12* (2013.01); *B23B 31/1071* (2013.01); *B23B 2231/04* (2013.01)

(58) Field of Classification Search
CPC ... B25B 21/007; B25B 23/0035; B25B 23/12; B25B 23/08; B23B 31/107;
(Continued)

(56) References Cited

U.S. PATENT DOCUMENTS 4,644,985 A * 2/1987 Weaver .................. B23Q 35/46
144/144.51
5,182,973 A * 2/1993 Martindell .......... B25B 23/0064
81/429

(Continued)

FOREIGN PATENT DOCUMENTS

| DE | 10219418 A1 * | 11/2003 | ......... B25B 23/0035 |
| EP | 0086352 A2 * | 8/1983 | ......... B25B 23/0064 |
| EP | 2806999 A1 | 8/2013 | |

OTHER PUBLICATIONS

Machine Translation, DE 10219418 A1, Abel. M., 2003. (Year: 2003).*

(Continued)

*Primary Examiner* — Chwen-Wei Su
(74) *Attorney, Agent, or Firm* — Burr & Forman LLP

(57) ABSTRACT

A bit holder is provided including a tool bit receiver body operably configured to receive at least a portion of a tool bit, a retention element configured to retain the tool bit engaged within the tool bit receiver body, a release configured to disengage the retention element enabling removal of the tool bit, a drive element operably coupled to the tool bit receiver body and configured to transfer axial rotation from a driving tool to the tool bit receiver body, and a sleeve disposed around at least a portion of the bit holder and configured such that the tool bit receiver body rotates independent of the axial rotation of at least a portion of the sleeve.

15 Claims, 4 Drawing Sheets

(58) Field of Classification Search
CPC ............ B23B 31/1071; B23B 31/1074; B23B 2231/04; Y10T 279/17752; Y10T 279/17794; Y10T 279/17811; Y10T 279/17743; Y10T 279/3406; Y10S 279/904; Y10S 279/905

See application file for complete search history.

(56) References Cited

U.S. PATENT DOCUMENTS

| | | | | |
|---|---|---|---|---|
| 5,577,743 | A * | 11/1996 | Kanaan | ................. B23B 31/223 279/72 |
| 5,851,151 | A | 12/1998 | Reynolds | |
| 6,053,675 | A | 4/2000 | Holland et al. | |
| 6,651,990 | B2 * | 11/2003 | Higasi | ................. B25B 23/0035 279/19.4 |
| 6,929,266 | B2 | 8/2005 | Peters et al. | |
| 7,082,864 | B1 * | 8/2006 | Weber | ..................... B25B 13/06 81/180.1 |
| 7,290,470 | B1 * | 11/2007 | Peters | ................... B25B 15/001 81/439 |
| 7,565,854 | B2 * | 7/2009 | Chiang | ................. B25B 15/001 279/75 |
| 8,302,513 | B2 * | 11/2012 | Evatt | .................... B25B 23/0064 81/451 |
| 8,308,168 | B2 | 11/2012 | Nash | |
| 8,800,999 | B2 * | 8/2014 | Puzio | ................. B23B 31/1071 279/30 |
| 2011/0023666 | A1 | 2/2011 | Hsu | |
| 2013/0220086 | A1 | 8/2013 | Peters et al. | |
| 2015/0202751 | A1 * | 7/2015 | Chen | .................... B25B 23/0057 279/9.1 |
| 2015/0336246 | A1 | 11/2015 | Peters et al. | |
| 2015/0357145 | A1 | 12/2015 | Shaps et al. | |
| 2016/0107299 | A1 | 4/2016 | Hsu | |
| 2017/0217005 | A1 * | 8/2017 | Mohanasundaram | ....................... B25D 17/084 |

OTHER PUBLICATIONS

Machine Translation, EP 0086352 A2, Lieser, K., Aug. 24, 1983. (Year: 1983).*

International Search Report and Written Opinion of PCT/US2017/065219, dated Mar. 28, 2018, all enclosed pages cited herein.

* cited by examiner

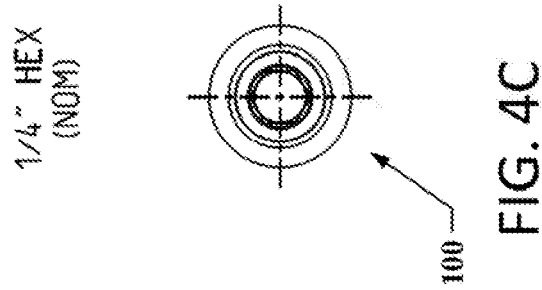
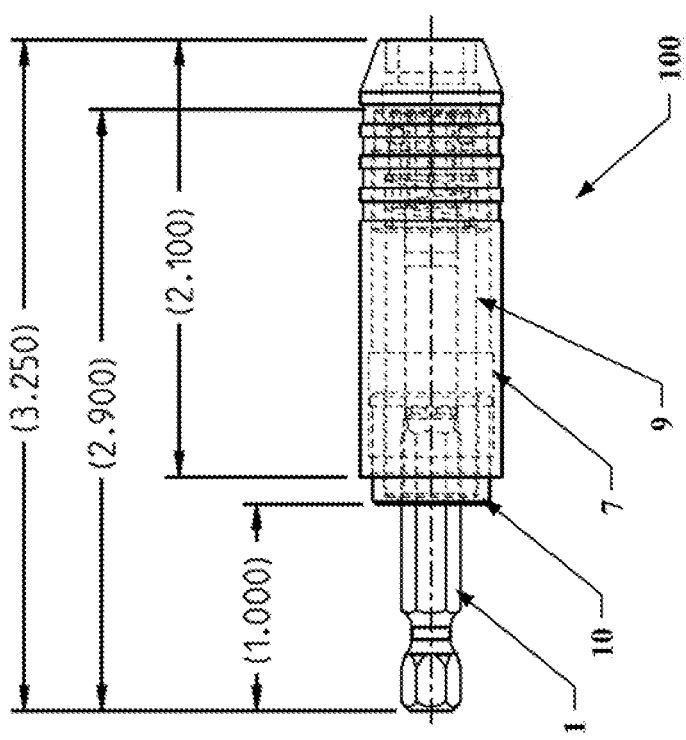
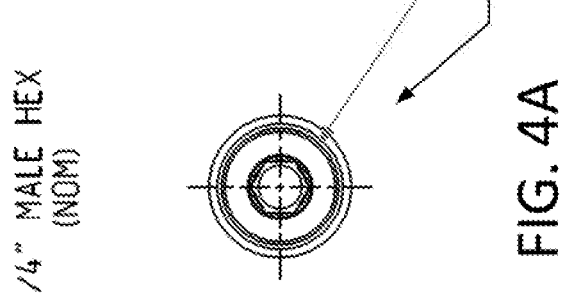

ANTI-MARRING BIT HOLDER

CROSS REFERENCE TO RELATED APPLICATIONS

This application claims priority to U.S. application No. 62/431,498 filed Dec. 8, 2016, the entire contents of which are hereby incorporated by reference in its entirety.

TECHNICAL FIELD

Example embodiments generally relate to tools for holding tool bits and, in particular, relate to bit holders driven by rotating hand or power tools.

BACKGROUND

Bit holders are familiar tools for holding tool bits, such as fastener driving bits, drill bits, sanding or brushing bits, or the like, which may be configured for applying and removing threaded fasteners, such as screws and bolts, drilling holes, smoothing materials, or the like. Bit holders are typically sized and shaped to marry with at least a portion of the tool bit having a corresponding size and shape.

Some conventional bit holders may come into contact with a surface of the item to be worked and/or proximate the bit holder. As a result of the interaction between the bit holder and the surface of the item, the surface may be marred. For example, while drilling or applying a fastener parallel to a wall, or other finished surface, a portion of a conventional bit holder, such as the release or chuck adjust, may come into physical contact with a finished surface of the wall or other material. When the bit holder is turned to work the material, the physical contact between the bit holder and the wall may mar the surrounding surfaces. In some circumstances, this physical contact between the bit holder and the surface surrounding the bit holder may be the result of the length of tool bit being less than the depth of an access point. Further, the same bit holder is often utilized with a variety of tool bits having different lengths thereby increasing the risk of marring.

Thus, it is desirable to provide a new design for a bit holder that addresses these concerns.

BRIEF SUMMARY OF SOME EXAMPLES

Some example embodiments may enable the provision of a bit holder apparatus having anti-marring functionalities. Additionally, or alternatively, some example embodiments may enable the provision of a bit holder apparatus that is configured to engage tool bits having various lengths and shape features, while maintaining anti-marring functionalities.

According to some example embodiments, a bit holder is provided including a tool bit receiver body configured to receive at least a portion of a tool bit, a retention element configured to retain the tool bit engaged within the tool bit receiver body, a release configured to disengage the retention element enabling removal of the tool bit, a drive element operably coupled to the tool bit receiver body and configured to transfer axial rotation from a driving tool to the tool bit receiver body, and a sleeve disposed around at least a portion of the bit holder and configured such that the tool bit receiver body rotates independent of the axial rotation of at least a portion of the sleeve.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 4A illustrates a rear view of an example bit holder according to an example embodiment;

FIG. 4B illustrates a side view of an example bit holder with internal elements shown in dotted lines according to an example embodiment;

FIG. 4C illustrates a front view of an example bit holder according to an example embodiment.

DETAILED DESCRIPTION

Figure 1:
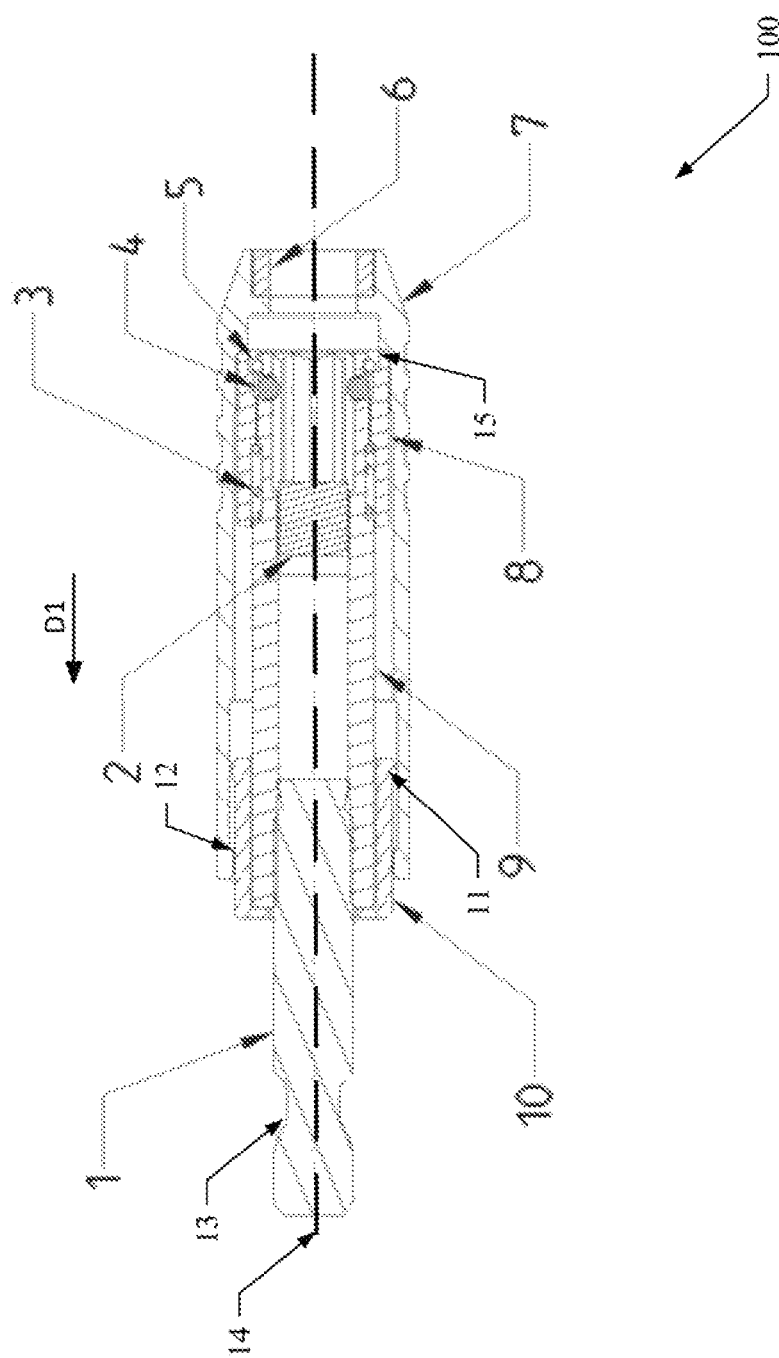
FIG. 1 illustrates a cross-section view of an example bit holder according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other. Furthermore, as used herein, the term "or" is to be interpreted as a logical operator that results in true whenever one or more of its operands are true.

As indicated above, some example embodiments relate to provision of a bit holder for working a material with one or more different types of tool bits. According to some example embodiments, a bit holder is provided that includes an anti-marring sleeve. The sleeve assembly may be configured to freely rotate about the tool bit receiver body. The sleeve may include an inner sleeve and outer sleeve. The outer sleeve may include a textured grip portion such that the outer sleeve may be moved in a first direction along a longitudinal axis of the bit holder to engage a release, e.g. a quick release, which in turn disengages the tool bit. Since the sleeve is configured to rotate independently of the bit holder, the outer sleeve may be held during rotation of the bit holder. Additionally, an example bit holder may include one or more magnets configured to retain the tool bit within the tool bit receiver body. The magnets may include a magnet at an end opposite the tool bit receiver aperture or a ring magnet disposed around a periphery of the tool bit receiver aperture. The ring magnet disposed around the periphery of the tool bit receiver aperture may provide for magnetic engagement of fasteners with tool bits of differing lengths while also facilitating anti-marring functionalities as further described below.

Figure 2:
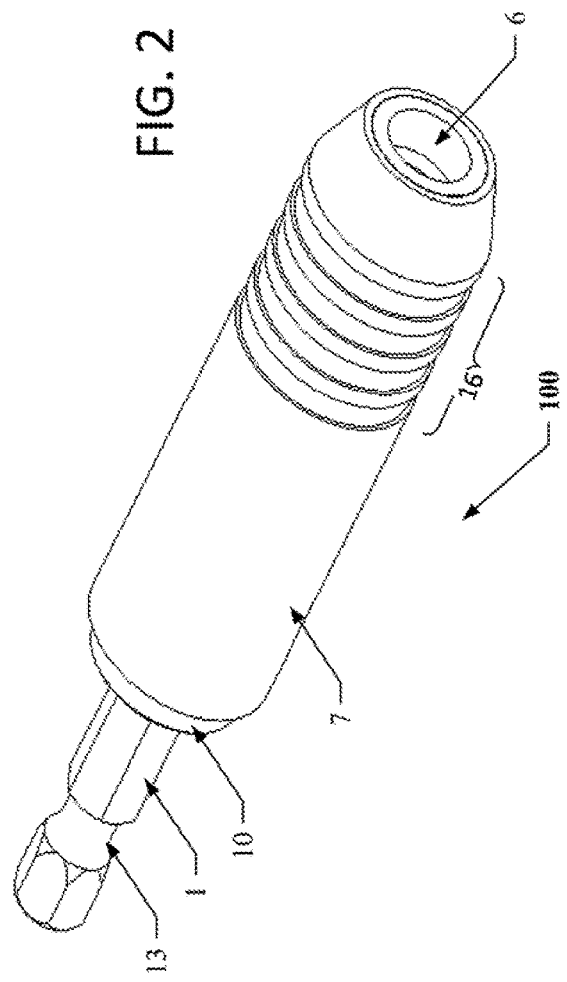
FIG. 2 illustrates a perspective view of an example bit holder according to an example embodiment.
Figure 3:
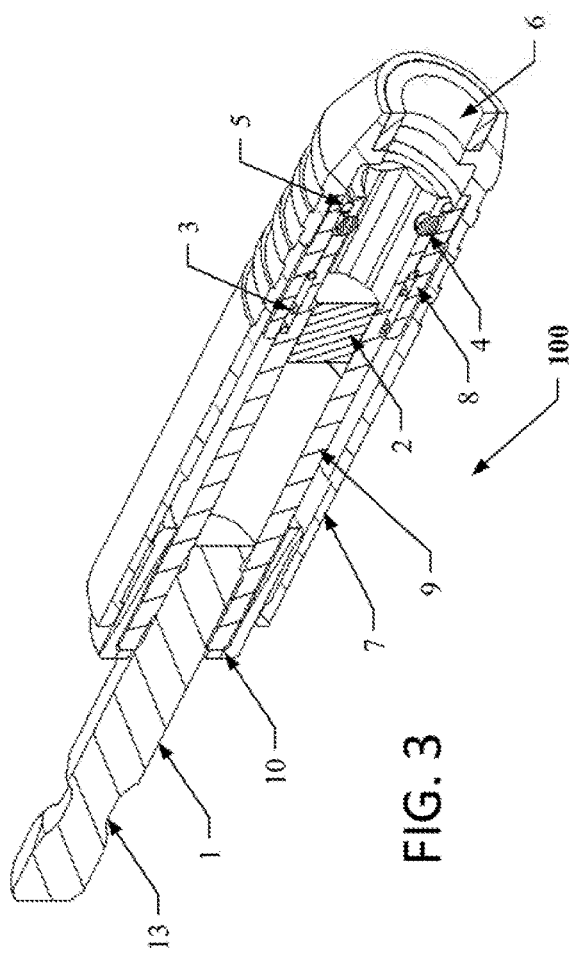
FIG. 3 illustrates a cross-section perspective view of an example bit holder according to an example embodiment.

FIG. 1. illustrates a cross-section view of an example bit holder 100, FIG. 2 illustrates a perspective view of an example bit holder 100, and FIG. 3 illustrates a cross-section perspective view of the example bit holder 100 according to some example embodiments. With respect to example bit holder 100, the bit holder 100 may be comprised of a tool bit receiver body 9. The tool bit receiver body 9 may be formed of, for example, steel and include a generally cylindrically shaped exterior surface. The tool bit receiver body 9 may be hollow or have a recess on the first and second ends of the tool bit receiver body 9. The first end may be configured to receive, and be operably coupled to, a drive element 1. The drive element 1, e.g. a drive tang, may be a complementary shape to recess formed at the first end of the tool bit receiver body 9. For example, the drive element 1 may include a hexagonal shaft and the recess of the first end of the tool bit receiver body 9 may include a hexagonal recess. The hexagonal configuration may be referred to herein as "hex." The drive element 1 may be fixed within the recess of the first end of the tool bit receiver body 9, such as by welding, heat fitting, adhesive, or the like. In some example embodiments, the drive element 1, may include a recess, such as around a periphery of the hexagonal shaft, configured to be engaged by a driving tool such as a drill chuck to prevent or limit axial movement of the bit holder 100.

The second end of tool bit receiver body 9 may include a tool bit receiver aperture configured to receive at least a portion of a tool bit, such as a drill bit, fastener driver, sanding or brushing bit, or the like. The shape of the tool bit receiver aperture may be configured to be complementary to the portion of the tool bit to be received therein. In one example the tool bit receiver aperture may be a hexagonal recess and the portion of the tool bit may include a hexagonal shaft.

Although described as hexagonal, the first recess and the tool bit receiver aperture may be polygonal, pentagonal, octagon, circular with inset grooves, or any other configuration to enable translation of rotational force from the tool driver to the drive element 1, the drive element 1 to the tool bit receiver body 9, and the tool bit receiver body 9 to the tool bit.

The tool bit receiver body 9 may define an axis of rotation 14, or longitudinal axis of the bit holder 100 that passes through the center of the tool bit receiver aperture, the center of the first recess, and through the drive element 1. When the bit holder 100 is in use to turn a tool bit, the rotation of the tool bit, and in turn, the rotation of the tool bit receiver body 9 and the drive element 1, may occur about the axis of rotation 14.

The bit holder 100 may include a retention element. The retention element may include a ball lock, a retention spring, or a lever. In an embodiment in which the retention element includes a ball lock, the retention element may include one or more balls 4 and a bias spring 3. The spring 3 may be configured to bias the balls 4 toward the longitudinal axis, e.g. axis of rotation 14 of the tool bit receiver aperture. In response to the force exerted by the spring 3, the balls 4 may exert an axial force on a tool bit inserted into the tool bit receiver aperture. In an instance in which the tool bit includes a locking recess, the balls 4 may engage the locking recess. In an example embodiment, the spring 3 may exert the bias force on the balls 4 via a release 8, e.g. a quick release collar. The release 8 may be configured to disengage the retention element enabling release of the tool bit. In operation, the release 8 may be moved in a first direction D1 by an operator, which may compress spring 3. The release 8 may have a recess enabling the balls 4 to move outwardly away from the longitudinal axis into the recesses of the release 8, which may disengage the tool bit enabling removal of the tool bit. The release 8, spring 3, and balls 4 may be operably coupled to the tool bit receiver body 9, such as by a retention ring 5.

In some example embodiments, the tool bit receiver body 9 may include an internal magnet 2. The internal magnet 2 may be disposed at a second end of the tool bit receiver aperture opposite a receiving end. The internal magnet 2 may provide a retention force biasing ferric tool bits toward a seated position of the tool bit receiver aperture. The internal magnet 2 may provide a biasing force to retain ferritic fasteners at the end of the tool bit.

In an example embodiment, the bit holder 100 may include a sleeve. In function, the sleeve may operate to at least assist in performing an anti-marring function for the bit holder 100. The sleeve may be comprised of a plurality of sleeves, e.g. an inner sleeve 10 and an outer sleeve 7 that are operably coupled to the tool bit receiver body 9. According to some example embodiments, the inner sleeve 10 and outer sleeve 7 may be configured to rotate freely about the tool bit receiver body 9 and, in some embodiments, the inner sleeve 10 and outer sleeve 7 are concentric and may slide into or nest with each other. According to some example embodiments, at least one of the sleeves, such as the outer sleeve 7, may be constructed of or coated by an anti-marring or non-abrasive material, such as, for example, a polymeric material (e.g. urethane or the like). According to some example embodiments, one or more of the sleeves, such as the outer sleeve 7, may be composed of or coated by Nylatron® or Nyloil® MDX. Further, the inner sleeve 10 and outer sleeve 7 may be configured to freely spin or rotate relative to the tool bit receiver body 9 and the axis of rotation 14. This free spinning functionality may permit a user of the bit holder 100 to grasp the bit holder 100 by the sleeve and to hold the sleeve stationary while the tool bit receiver body 9 turns within the sleeve during operation of the tool driver. Accordingly, the ability to hold the sleeve in a stationary position while the tool bit receiver body 9 is turning operates as an anti-marring feature, since at least a portion of the sleeve, e.g. at least outer sleeve 7, is not turning with the tool bit receiver body 9 against a surface proximate to the bit holder 100.

The inner sleeve 10 may be operably coupled to the drive element 1 and/or the tool bit receiver body 9 towards the rear of the bit holder 100 or at least behind or rearward of the outer sleeve 7. The inner sleeve 10 may be generally formed as a cylindrical tube. The inner sleeve 10 may be configured to rotate or spin radially about the tool bit receiver body 9 and the axis of rotation 14. In an example embodiment, the inner sleeve 10 may be held in position on the tool bit receiver body 9 by a ridge and groove engagement. According to some example embodiments, the inner sleeve 10 may include a ridge 11, and the tool bit receiver body 9 may include a corresponding groove that is formed about an outer circumference of the tool bit receiver body 9. Additionally or alternatively, the inner sleeve 10 and the outer sleeve 7 may include complementary ridges 11 and 12 configured to retain the inner sleeve 10 and outer sleeve 7 on the bit holder 100. The ridge and groove engagement of the inner sleeve 10 with the tool bit receiver body 9, or the complementary ridges of the inner sleeve 10 and outer sleeve 7 may operate to permit radial movement of the inner sleeve 10 relative to the tool bit receiver body 9, but prevent or restrict axial movement relative to the tool bit receiver body 9.

The outer sleeve 7 may be operably coupled external to the tool bit receiver body 9 at the forward end (i.e., the end adjacent the tool bit receiver aperture). The outer sleeve 7 may be generally formed as a cylindrical tube. The outer sleeve 7 may be configured to rotate radially relative to the tool bit receiver body 9 and the axis of rotation 14. Further, the outer sleeve 7 may be configured to also translate axially relative to the tool bit receiver body 9 and the axis of rotation 14. In this regard, the outer sleeve 7 may include ridge 12 that extends towards the inner sleeve 10 and tool bit receiver body 9 and engages with ridge 11 extending from the inner sleeve 10 towards the outer sleeve 7 to prevent further forward axial movement of the outer sleeve 7 beyond engagement of the ridge 11 of the inner sleeve 10. The axial rotation of the tool bit receiver body 9 may be decoupled from at least a portion of the sleeve, e.g. outer sleeve 7 or outer sleeve 7 and inner sleeve 10. In other words, the tool bit receiver body 9 may rotate independent of at least a portion of the sleeve.

As discussed above, the inner sleeve 10 may move axially, or translate within the outer sleeve 7. In this regard, the inner sleeve 10 may have at least a portion of the sleeve that has an outer diameter that is smaller than the inner diameter of the outer sleeve 7 to facilitate nesting of the sleeves. Alternatively, according to some example embodiments, the inner sleeve 10 (or a portion of the inner sleeve 10) may have an inner diameter that is larger than the outer diameter of the outer sleeve 7, and the inner sleeve 10 may be configured to translate over the outer sleeve 7.

According to some example embodiments, the outer sleeve 7 may be disposed around a periphery of the release 8. The outer sleeve 7 may include a release engagement member 15, such as a lip. In response to the outer sleeve 7 being moved in the first direction D1 by an operator the release engagement member 15 may exert force in the first direction D1 upon the release 8, which may compress spring 3. The movement of the release 8 in the first direction D1 may disengage the retention element, e.g. balls 4, from the tool bit enabling removal of the tool bit. In an example embodiment, the outer sleeve 7 may include a textured grip area 16 disposed on an outer surface of the outer sleeve 7. The textured grip area 16 may include ribs, cross ridges or recesses, or the like.

According to some example embodiments, the sleeve may further comprise a fastener retention magnet 6. The fastener retention magnet 6 may function to magnetically attract and hold a portion of a fastener in place at the end of the accompanying tool bit engaged in receiver body 9 within the tool bit receiver aperture. The fastener retention magnet 6 may be a ring magnet. In this regard, the fastener retention magnet 6 may be composed of any type of magnetic material including, for example, neodymium or rare earth. The fastener retention magnet 6 may be housed within an internal cavity (e.g. machined cavity) of the outer sleeve 7. According to some example embodiments, the internal cavity may be disposed at an inside periphery of the tool bit receiver aperture.

FIGS. 4A-4C illustrates a rear view, a side view, and a front view of the bit holder 100 according to an example embodiment. FIGS. 4A-4C illustrate dimensions of an example embodiment of the bit holder, for example the drive element 1 and tool bit receiver aperture may each have 0.25 inch hex configuration. The exposed portion of the drive element 1 may be approximately 1 inch long. The bit holder 100, excluding the sleeve, may be approximately 2.9 inches long and 3.25 inches long including the sleeve. The outer sleeve 7 may be approximately 2.1 inches with a travel relative to the tool bit receiver body 9 of approximately 0.25 inches.

The two piece sleeve, e.g. inner sleeve 10 and outer sleeve 7 may be anti-marring and free spinning, which may limit or prevent damage to surrounding surfaces during operation of the bit holder 100. The fastener retention magnet 6 being integrated in the outer sleeve 7 may allow for the fastener retention magnet 6 to slide along the axis of the tool bit, directly contacting the tool bit, which may increase retention of fasteners. The release 8 being operable by the outer sleeve 7 may enable fast and easy tool bit change or replacement. The inner sleeve 10 and outer sleeve 7 may allow for the bit holder 100 to accommodate multiple tool bit types with different engagement lengths, and allows for the entire tool bit receiver body 9 to remain covered independent of position of the outer sleeve 7, which may improve operator safety.

Figure 5A:
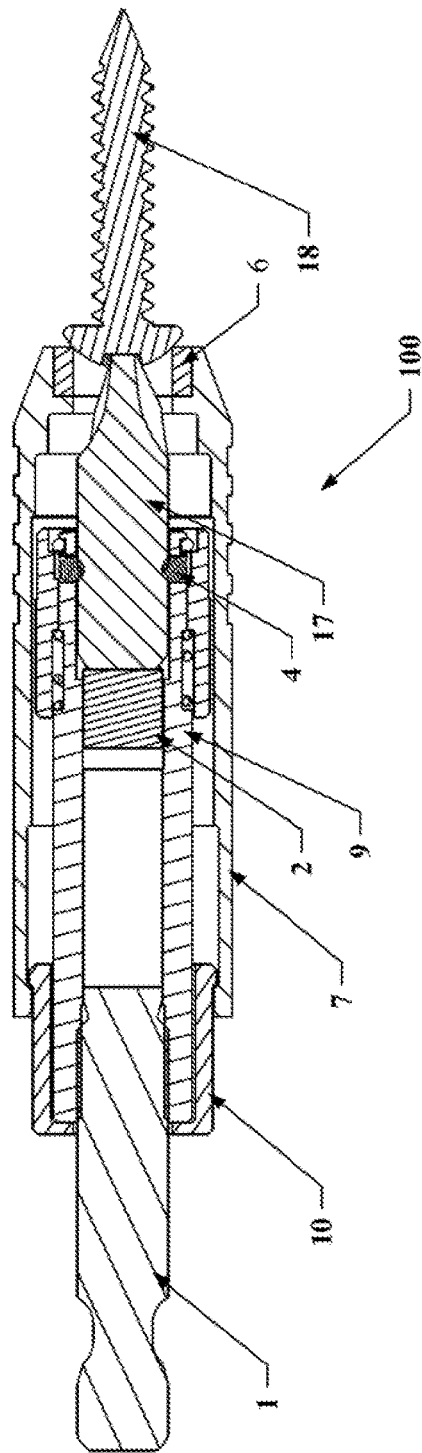
FIGS. 5A and 5B illustrate a cross-sectional view of an example bit holder with a tool bit and fastener according to an example embodiment.
Figure 5B:
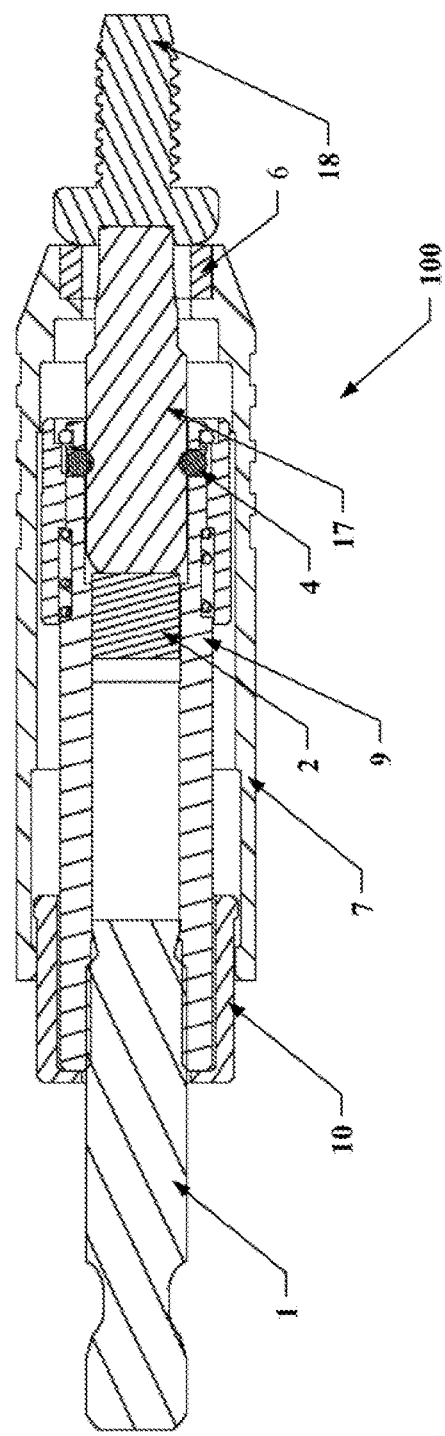

FIGS. 5A and 5B illustrate a cross-sectional view of an example bit holder 100 with a tool bit 17 and fastener 18. The tool bit 18 may be received within the tool bit receiver aperture of the tool body 9 and retained by the balls 4 and the internal magnet 2. The tool bit 17 of FIG. 5A does not extend past the outer sleeve 7. As such a portion of the head of the fastener 18 is within the outer sleeve 7 when engaged with the tool bit 17. The fastener retention magnet may apply a magnetic retention force to the fastener biasing the fastener toward the tool bit 17. The magnetic force may be aided by the magnetic force of the tool bit 17 itself or the internal magnet 2 via the tool bit 17. Although only a portion of the head of the fastener 18 is within the outer sleeve 7 in the depicted embodiment, one of ordinary skill in the art would immediately appreciate that a smaller diameter head would allow the entire head of the fastener and in some instances a portion of the fastener shaft to be within the outer sleeve 7. Additionally, as depicted in FIG. 5B, a larger head of a fastener may not enter the outer sleeve. The tool bit 17 may extend past the outer sleeve 7 to engage with the fastener 18. The fastener retention magnet 6 may retain the fastener, as described above. As depicted in FIGS. 5A and 5B, the fastener retention magnet 6 may retain fasteners at a plurality of engagement length and with differing head diameters.

In some example embodiments, the bit holder may be further configured for optional modifications. In this regard, for example, the sleeve is disposed around a periphery of the release. In an example embodiment, the sleeve includes an anti-marring material. In some example embodiments, the sleeve includes nylon. In an example embodiment, the sleeve includes a ring magnet disposed around a tool bit receiver aperture. In some example embodiments, the release is configured to disengage the retention element in response to the sleeve moving in a first direction toward the drive element which causes the sleeve to engage the release. In some example embodiments, the sleeve includes an inner sleeve and an outer sleeve. In some example embodiments, the inner sleeve and outer sleeve include complementary ridges configured to retain the sleeve on the bit holder. In some example embodiments, the outer sleeve includes a release engagement lip configured to disengage the retention element in response to the sleeve moving in a first direction toward the drive element, which causes the sleeve to engage the release. In some example embodiments, the sleeve includes a textured grip area disposed on an outer surface of the sleeve. In some example embodiments, the driver element includes a hex drive. In some example embodiments, the tool bit receiver body includes a hex shaped tool bit receiver aperture. In some example embodiments, the retention element includes a ball and a spring configured to bias the ball into a tool bit receiver aperture, wherein the ball is configured to engage a recess of the tool bit. In some example embodiments, disengaging the retention element includes the release applying a force compressing the spring which relieves the bias applied to the ball. In some example embodiments, the tool bit receiver body includes a fastener retention magnet. In an example embodiment, the fastener retention magnet enables retention of a fastener at a plurality of engagement lengths Many modifications and other embodiments of the bit holder set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A bit holder comprising:
   a tool bit receiver body configured to receive at least a portion of a tool bit;
   a retention element configured to retain the tool bit engaged within the tool bit receiver body;
   a release configured to disengage the retention element enabling removal of the tool bit;
   a drive element operably coupled to the tool bit receiver body and configured to transfer axial rotation from a driving tool to the tool bit receiver body; and
   a sleeve disposed around at least a portion of the bit holder such that the sleeve is freely and independently rotatable relative to the tool bit receiver body to avoid marring of surfaces adjacent to the bit holder during use,
   wherein, to further avoid marring of surfaces adjacent to the bit holder during use, the sleeve is entirely constructed of an anti-marring material or the sleeve is externally coated along an entire axial length of the sleeve parallel to an axis of rotation of the bit holder with the anti-marring material,
   wherein the sleeve is disposed to extend around and fully enclose the tool bit receiver body, the retention element and the release,
   wherein the sleeve comprises an inner sleeve and an outer sleeve, and
   wherein the outer sleeve comprises a release engagement lip configured to disengage the retention element in response to the sleeve moving in a first direction toward the drive element to cause the sleeve to engage the release.

2. The bit holder of claim 1, wherein the anti-marring material comprises nylon.

3. The bit holder of claim 2, wherein the sleeve at least partially encloses the drive element.

4. The bit holder of claim 2, wherein the sleeve comprises a ring magnet disposed around a tool bit receiver aperture.

5. The bit holder of claim 2, wherein the inner sleeve and outer sleeve comprise complementary ridges configured to retain the sleeve on the bit holder.

6. The bit holder of claim 1, wherein the sleeve comprises a ring magnet disposed around a tool bit receiver aperture.

7. The bit holder of claim 1, wherein the inner sleeve and outer sleeve comprise complementary ridges configured to retain the sleeve on the bit holder.

8. The bit holder of claim 1, wherein the retention element comprises a ball and a spring configured to bias the ball into a tool bit receiver aperture, wherein the ball is configured to engage a recess of the tool bit.

9. The bit holder of claim 8, wherein disengaging the retention element comprises the release applying a force compressing the spring to relieve the bias applied to the ball.

10. The bit holder of claim 1, wherein the tool bit receiver body comprises a fastener retention magnet.

11. The bit holder of claim 10, wherein the fastener retention magnet enables retention of a fastener at a plurality of engagement lengths.

12. The bit holder of claim 1, wherein the sleeve at least partially encloses the drive element.

13. The bit holder of claim 1, wherein the anti-marring material comprises a polymeric material or a urethane.

14. A bit holder comprising:
    a tool bit receiver body configured to receive at least a portion of a tool bit;
    a retention element configured to retain the tool bit engaged within the tool bit receiver body;
    a release configured to disengage the retention element enabling removal of the tool bit a drive element operably coupled to the tool bit receiver body and configured to transfer axial rotation from a driving tool to the tool bit receiver body; and
    a sleeve disposed around at least a portion of the bit holder such that the sleeve is freely and independently rotatable relative to the tool bit receiver body to avoid marring of surfaces adjacent to the bit holder during use,
    wherein, to further avoid marring of surfaces adjacent to the bit holder during use, the sleeve is entirely constructed of an anti-marring material or the sleeve is externally coated along an entire axial length of the sleeve parallel to an axis of rotation of the bit holder with the anti-marring material,
    wherein the sleeve is disposed to extend around and fully enclose the tool bit receiver body, the retention element and the release,
    wherein the sleeve comprises an inner sleeve and an outer sleeve,
    wherein the inner sleeve and outer sleeve comprise complementary ridges configured to retain the sleeve on the bit holder,
    wherein the complementary ridges allow the inner sleeve and the outer sleeve to freely and independently rotate with respect to each other and the tool bit receiver body, and
    wherein complementary ridges allow the inner sleeve and the outer sleeve to slide respective to each other axially without separating.

15. A bit holder comprising:
a tool bit receiver body configured to receive at least a portion of a tool bit;
a retention element configured to retain the tool bit engaged within the tool bit receiver body;
a release configured to disengage the retention element enabling removal of the tool bit;
a drive element operably coupled to the tool bit receiver body and configured to transfer axial rotation from a driving tool to the tool bit receiver body; and
a sleeve disposed around at least a portion of the bit holder such that the sleeve is freely and independently rotatable relative to the tool bit receiver body to avoid marring of surfaces adjacent to the bit holder during use,
wherein, to further avoid marring of surfaces adjacent to the bit holder during use, the sleeve is entirely constructed of an anti-marring material or the sleeve is externally coated along an entire axial length of the sleeve parallel to an axis of rotation of the bit holder with the anti-marring material,
wherein the sleeve is disposed to extend around and fully enclose the tool bit receiver body, the retention element and the release,
wherein the release is configured to disengage the retention element in response to the sleeve moving in a first direction toward the drive element and engaging the release to move the release with the sleeve in the first direction,
wherein the release comprises a collar, and
wherein, as the sleeve transitions from an unlocked position to a locked position, a recess in the collar moves out of alignment with the retention element and passes over a retention ring that retains the release on the tool bit receiver body against an urging by a spring in an axial direction.

* * * * *